US008595492B2

(12) United States Patent
McReynolds et al.

(10) Patent No.: US 8,595,492 B2
(45) Date of Patent: Nov. 26, 2013

(54) ON-DEMAND PROTECTION AND AUTHORIZATION OF PLAYBACK OF MEDIA ASSETS

(75) Inventors: Paul McReynolds, Seaside, CA (US); Eric B. Dachs, Burlingame, CA (US); Erik Bielefeldt, Stanford, CA (US); Craig Wood, Berkeley, CA (US)

(73) Assignee: Pix System, LLC, San Francisco, CA (US)

( * ) Notice: Subject to any disclaimer, the term of this patent is extended or adjusted under 35 U.S.C. 154(b) by 764 days.

(21) Appl. No.: 12/544,008

(22) Filed: Aug. 19, 2009

(65) Prior Publication Data

US 2010/0077212 A1   Mar. 25, 2010

Related U.S. Application Data

(60) Provisional application No. 61/090,848, filed on Aug. 21, 2008.

(51) Int. Cl.
*H04L 29/06* (2006.01)

(52) U.S. Cl.
USPC ........... 713/168; 713/155; 713/156; 713/157; 713/158; 713/159; 713/169; 713/170; 713/171; 713/172; 713/173; 713/174; 713/175; 713/176; 713/177; 713/178; 713/179; 713/180; 713/181

(58) Field of Classification Search
USPC ......................................................... 713/168
See application file for complete search history.

(56) References Cited

U.S. PATENT DOCUMENTS

| | | | | |
|---|---|---|---|---|
| 6,771,323 | B1 * | 8/2004 | Dean et al. | 348/722 |
| 2003/0018917 | A1 * | 1/2003 | Brown, Sr. | 713/201 |
| 2003/0091186 | A1 * | 5/2003 | Fontijn et al. | 380/201 |
| 2003/0128228 | A1 * | 7/2003 | Crow et al. | 345/716 |
| 2004/0139318 | A1 * | 7/2004 | Fiala et al. | 713/165 |
| 2004/0210772 | A1 * | 10/2004 | Hooker et al. | 713/201 |
| 2005/0076208 | A1 * | 4/2005 | Hori et al. | 713/165 |
| 2006/0215115 | A1 * | 9/2006 | Long et al. | 352/38 |
| 2007/0076876 | A1 * | 4/2007 | Kaplan | 380/255 |
| 2007/0079117 | A1 * | 4/2007 | Bhogal et al. | 713/160 |

OTHER PUBLICATIONS

Espacenet search, Espacenet Result List, Dec. 2011.*
DRM Specification V2.0, Digital Rights Management, Apr. 2004.*
Iannella et al, A review of the OMA DRM V2 ODRL Profile, 2005.*

(Continued)

*Primary Examiner* — Andy Rao
*Assistant Examiner* — Shan Elahi
(74) *Attorney, Agent, or Firm* — Nixon Peabody LLP

(57) ABSTRACT

On-demand protection and authorization of playback of media assets includes receiving digital media at a server computer, storing intermediary data in a data store, and receiving a request from a client for the digital media. The method also includes generating a protected copy of the digital media from the digital media and the intermediary data. The method also includes storing a description of the protected copy in a database and sending the protected copy to the client. The method also includes receiving a request from the client to access the digital media and reading the description from the database based on information in the request. The method also includes sending a response to the client, the response indicating whether the client is authorized to access the digital media, and the response including cryptographic data to decrypt the protected digital media if the client is authorized to access the digital media.

28 Claims, 10 Drawing Sheets

(56) References Cited

OTHER PUBLICATIONS

Digital Watermarking, Digital Watermarking for Digital Media, 2005.*

Wang et al, Fair Use and File Sharing in Research and Education, Mar. 2009.*

Chandak et al, Can iTunes be weTunes?—Is FairPlay Playing Fair?, 2005.*

Blazquez, Digital Rights Managment Systems (DRMs): Recent Developments in Europe, Fall 2007, 17 Media L. & POL'Y, 23 pages.

Fretland, et al., Norsk Regnesentral, State of the Art in Digital Rights Management, A MARIAGE project report, Jun. 6, 2008, ISBN: 978-82-539-0528-0, 34 pages.

Chandak, et al., Can iTunes be weTunes?—Is FairPlay Playing Fair?, Middlesex University, UK, date Unknown, 16 pages, 2005.

Gasser, et al., The Berkman Center for Internet & Society at Harvard Law School, iTunes How Copyright, Contract, and Technology Shape the Business of Digital Media—A Case Study, Jun. 15, 2004 (revised version, 103 pages.

Milano, White Paper: Choosing the Right Web Video Codec, RHOZET A Business Unit of Harmonic Inc., Copyright 2008, 15 pages.

\* cited by examiner

ON-DEMAND PROTECTION AND AUTHORIZATION OF PLAYBACK OF MEDIA ASSETS

REFERENCE TO RELATED APPLICATIONS

This application claims priority from U.S. Provisional Application Ser. No. 61/090,848, filed on Aug. 21, 2008, the disclosure of which is incorporated herein by reference.

TECHNICAL FIELD

The present invention relates to the field of computer science. More particularly, the present invention relates to on-demand protection and authorization of playback of media assets.

BACKGROUND

The proliferation of digital media has had a substantial impact on the way that movies, music, and other media are created and distributed. The production process for audio and video media has changed radically in response to the availability of digital video and audio capture devices and editing systems, as well as due to the ability of media producers to collaborate electronically. But, although the shift to a digital production process has been a boon for creativity and productivity, it has also created new threats of piracy and unauthorized distribution of the inputs to production (e.g. un-edited video footage, concept art, scripts, storyboards, etc.). This is because the same file formats and communication systems that simplify collaboration in the production process may also be used to facilitate unauthorized uses of inputs to production. For example, a person working on a large film production project can just as easily post un-edited or partially edited footage on the Internet where it is available to any and all potential viewers as he can post it to a private intranet as part of his collaboration with others working on the project. Even when all people who are authorized to access a particular input to production can be trusted, there exists a threat that a third party will compromise the digital systems they use to communicate and collaborate to gain unauthorized access to it.

Similar threats of piracy and unauthorized distribution exist with respect to the final products of the production process. For the same reasons that electronic distribution of media, whether via the Web or thorough proprietary services (e.g. Apple Inc.'s "iTunes Store") is efficient for distributors and convenient for consumers, it is also subject to intellectual property (IP) theft, since digital media distributed electronically is easily redistributed from authorized people and devices to unauthorized people and devices. A digital video downloaded from the Web by an individual authorized to view it can easily be sent to another, unauthorized individual over an instant messaging system, a peer-to-peer network, email, or other electronic file sharing and communication channels. Even media distributed through conventional channels—such as movies distributed on DVD—is subject to IP theft through the use of technology that allows computer users to "rip" media from one format and storage medium (e.g. CD-format audio on a CD) to another (e.g. MP3-format audio on a user's hard drive). Once media has been "ripped" from a conventional storage medium, it can be redistributed just as easily as media that is distributed electronically in the first place.

The term "digital rights management" (DRM) describes technologies that protect the IP rights of creators and owners of digital media by preventing or impeding its unauthorized use and distribution. This is most often accomplished by the use of computer cryptography to obscure the contents of digital media files so that unauthorized users and programs cannot play them back.

There is a need among creators and owners of digital media for a DRM technology that is (1) sensitive to the context in which media is played back and (2) flexible enough to allow the rules of access to or re-distribution of a piece of media to be changed after it is initially distributed. Context-sensitive DRM determines whether a media file can be played back each time it is accessed by a user. In doing so it may consider, among other factors, when the file was initially distributed to the user, how it was distributed, the location of the user at the time the file is accessed, the software program or the hardware device being used to access the file, and the number of times the file has been accessed. Flexible rules of access allow creators of digital media and owners of rights to digital media to change the way in which access to a particular file is determined after the file has been distributed, or to revoke access completely.

Apple Inc.'s QuickTime file format is one of the most popular digital media formats. Files using the QuickTime file format are called "movies" and may contain various combinations of audio, video, and other types of information. A QuickTime movie contains one or more "tracks"—segments of audio, video or other data that are played simultaneously or consecutively when a user accesses the movie. The audio or video data in a track may itself be stored in one or more formats, or "encodings," that determine how a particular image or sound is represented in binary, and thus how audio or video is represented in the movie file. A QuickTime movie comprises a "header" describing the tracks that the movie contains and how the tracks are encoded, as well as one or more separate blocks of "movie data" comprising the actual binary representations of the tracks' contents. For audio and video tracks, track contents are divided into "samples"—instantaneous representations of the audio or video signal contained in the track at consecutive moments in time. The header of a QuickTime movie, in addition to describing the number and type of tracks it contains, indicates where in the movie file each sample for each audio or video track is located. The audio, video and other tracks contained in a QuickTime movie are accessed, or "played back," through one of several software programs that support the QuickTime format or the related MPEG-4 format. Many programs that support the QuickTime format make use of a "plug in" architecture that allows users to add support for new audio and video encodings by installing sets of machine language instructions for playing back tracks that use those encodings. Such sets of instructions are called "plug-ins" because they can be "plugged in" to existing programs to expand their capabilities.

There is a need among creators and owners of digital media for a DRM technology based on a widely used media file format. Where existing DRM technology requires the use of proprietary file formats, and thus of proprietary software (for example, files protected with Apple's FairPlay DRM technology may only be played back using Apple's iTunes software or select Apple-manufactured hardware devices), a DRM technology based on an existing file format can be made to interoperate with existing software—and media production processes built around existing software—when that software is based on a plug-in architecture. Apple's QuickTime Player and QuickTime Pro programs, as well as several other widely-used programs for creating, editing and playing back QuickTime files, fit this description. A need exists for DRM technology built on the QuickTime file format and implemented in plug-ins that extend the functionality of existing programs to provide security against IP theft while allowing creators and viewers of digital media to continue using the same software and processes they are used to.

OVERVIEW

Embodiments of the present invention provide a DRM system for on-demand authorization of playback of digital media. Authorization is "on-demand" in the sense that it occurs when a user initiates playback of a digital media file, and every time playback is initiated. As such, context-sensitive authorization is provided: whether playback is allowed may depend on one or more factors determined at the time a user attempts to play back the digital media, and each time the user attempts to play it back. Flexible authorization rules are also provided in that the way in which access is determined can be changed after a digital media file is distributed.

According to one aspect, the DRM system is based on the QuickTime file format. Specifically, it provides for conversion of ordinary QuickTime movies into a DRM-protected form that also complies with the QuickTime file format. Because protected movies are themselves QuickTime movies, the aspects of the system that provide for authorization and playback of protected movies can be implemented in one or more plug-ins that allow existing programs that support the QuickTime format to play protected movies as well.

According to one aspect, the DRM System protects digital media files by encrypting sensitive portions of the digital media files using a secret key. In order to play back a protected copy of a digital media file, a player program must first obtain the key. It does so by sending a request over a computer network to an authorization service controlled by the file's creator. If the authorization service determines that playback is authorized, it responds with the key, which the player uses to decrypt encrypted portions of the digital media as playback proceeds. The key is discarded when playback is finished. The player must therefore request authorization each time playback is initiated by the user.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
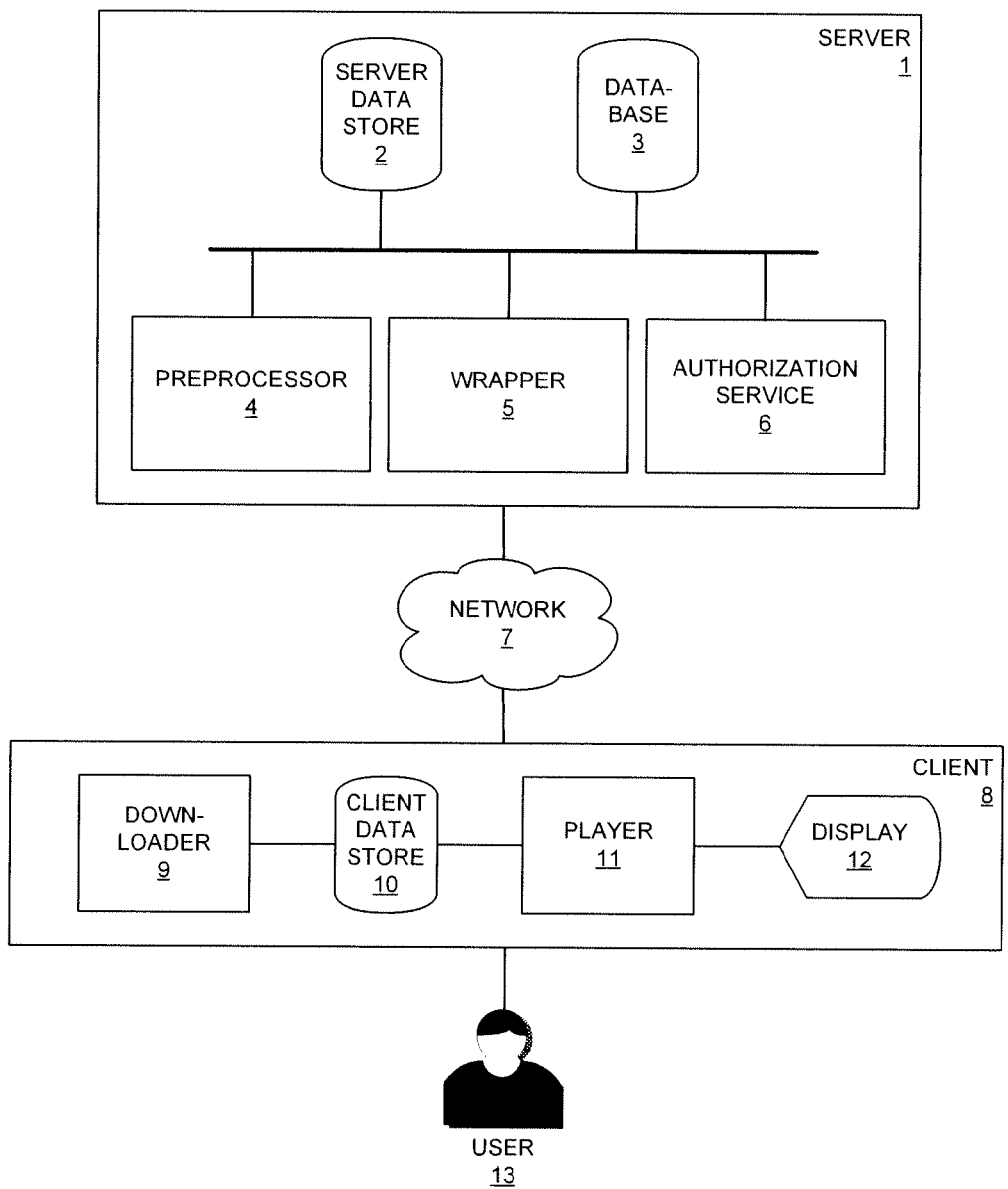
FIG. 1 is a block diagram that illustrates a digital rights management (DRM) system in accordance with one embodiment of the present invention.

Embodiments of the present invention are described herein in the context of on-demand protection and authorization of playback of media assets. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

According to one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

According to one embodiment of the present invention, the components, processes and/or data structures may be implemented using machine language, assembler, C or C++, Java and/or other high level language programs running on a data processing computer such as a personal computer, workstation computer, mainframe computer, or high performance server running an OS such as Solaris® available from Sun Microsystems, Inc. of Santa Clara, Calif., Windows Vista™, Windows NT®, Windows XP, Windows XP PRO, and Windows® 2000, available from Microsoft Corporation of Redmond, Wash., Apple OS X-based systems, available from Apple Inc. of Cupertino, Calif., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like.

It should be noted that the DRM system is illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a computer-readable medium as above as modules in any manner, and can be used separately or in combination.

Example embodiments of the present invention prevent users from redistributing media assets without authorization. This is done by encrypting sensitive data when an asset is accessed or "checked out," and then requiring the user to make a request for key data each time the asset is played back. This on-demand protection and authorization of playback of media assets scheme allows access to asset data to be controlled by a centralized system at the time of playback.

FIG. 1 is a block diagram that illustrates a digital rights management (DRM) system in accordance with one embodiment of the present invention. As shown in FIG. 1, the DRM system comprises a server 1 and one or more clients 8 coupled to the server 1 by a network 7. Server 1 comprises server data store 2, which is a file storage device. Server 1 also comprises database 3, which is a data storage system (e.g. a relational database). Server 1 also comprises preprocessor 4, wrapper 5, and authorization service 6. Preprocessor 4 and wrapper 5 are communicatively coupled to server data store 2. Wrapper 5 and authorization service 6 are communicatively coupled to database 3.

Still referring to FIG. 1, client 8 comprises downloader 9, which is configured to retrieve files through network 7 (e.g. a web browser) and store them on a client data store 10, which is a file storage device. Client 8 also comprises a player 11 and a display interface 12 for interfacing with a monitor or other device that can display digital video. Downloader 9 and player 11 are communicatively coupled to client data store 10. Player 11 is communicatively coupled to display 12. A user 13 interacts with client 8 to trigger one or more downloads and to initiate playback of one or more protected movies.

Figure 2:
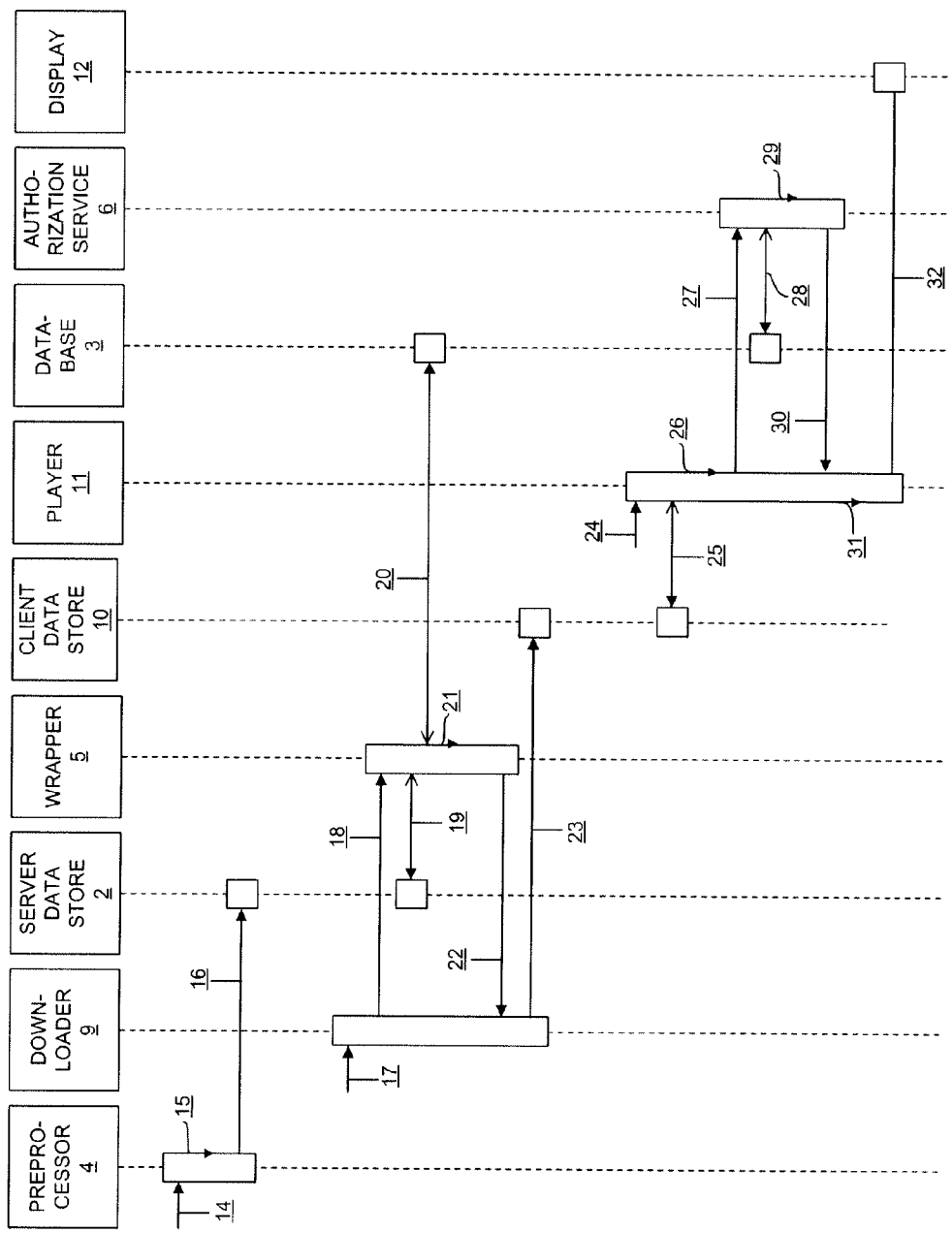
FIG. 2 is a sequence diagram illustrating a method by which a movie is protected and later played back in accordance with one embodiment of the present invention.

FIG. 2 is a sequence diagram illustrating a method by which a movie is protected and later played back in accordance with one embodiment of the present invention. When a new movie is added (14) to the DRM System, it is processed (15) by preprocessor 4 to create one or more intermediary files that are saved (16) to server data store 2 and that allow fast generation of protected copies of the movie by wrapper 5. When a user 13 invokes (17) the downloader 9 to download (18) a movie, wrapper 5 reads (19) the intermediary files from server data store 2, along with the original movie file, writes (20) a record to database 3 describing the protected movie to be created, and generates (21) a protected copy of the movie.

The protected copy of the movie is sent (22) to downloader 9, which writes (23) it to client data store 10. When user 13 initiates (24) playback of a protected movie, the player 11 reads (25) the movie from client data store 10, extracting (26) information to send (27) to authorization service 6 as part of a request to access the movie. Authorization service 6 uses this information to retrieve (28) the record describing the protected movie from database 3, determines (29) whether access to the movie should be granted, and sends (30) a response to player 11. Finally, player 11 processes (31) the authorization service's 6 response. If playback is authorized, player 11 uses cryptographic data contained in the response to decrypt the samples that comprise the movie's tracks, sending (32) them to display 12 for presentation to user 13.

Figure 3:
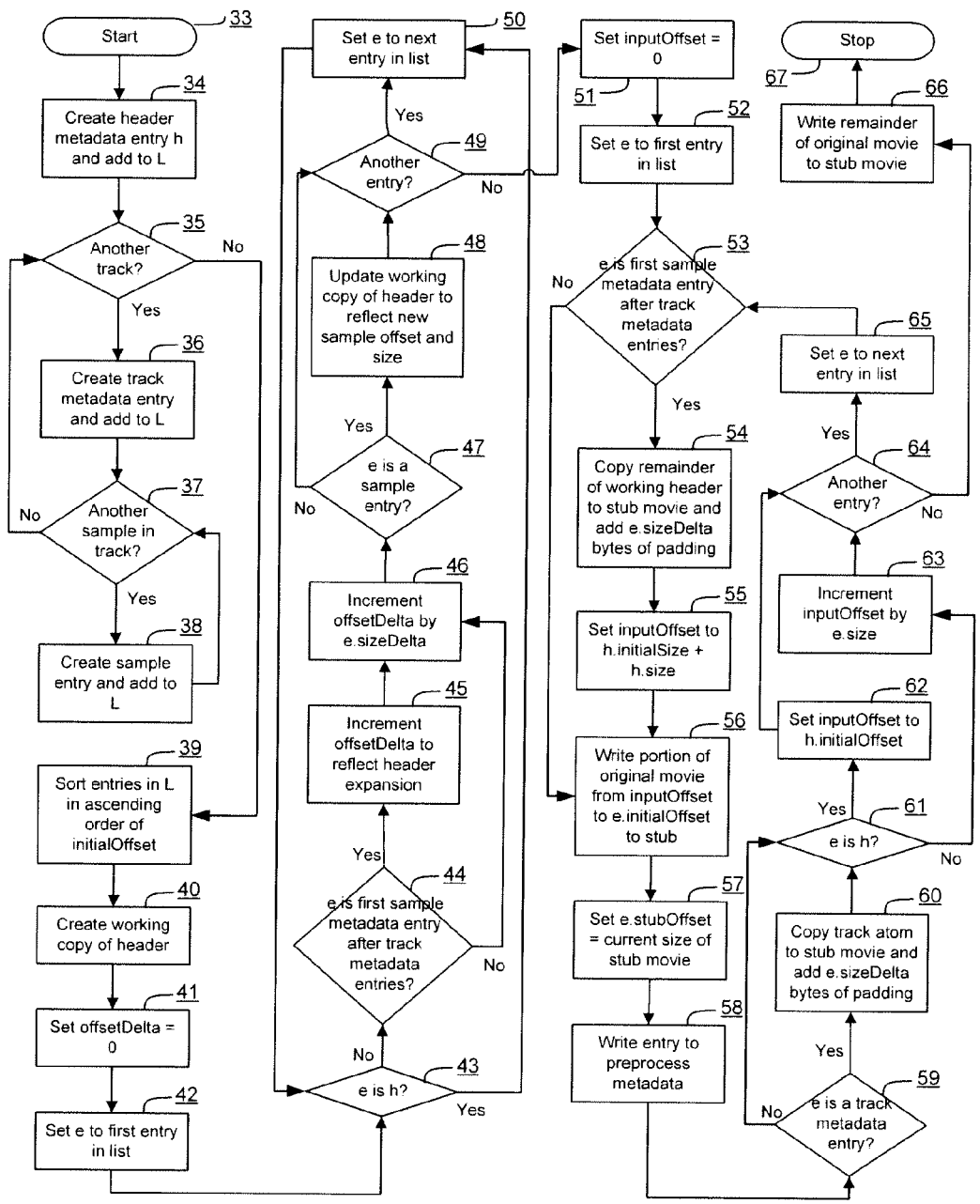
FIG. 3 is a flow chart that illustrates a method by which an unprotected movie is processed to generate intermediary data that is later used to quickly generate protected copies of the movie in accordance with one embodiment of the present invention.
Figure 9:
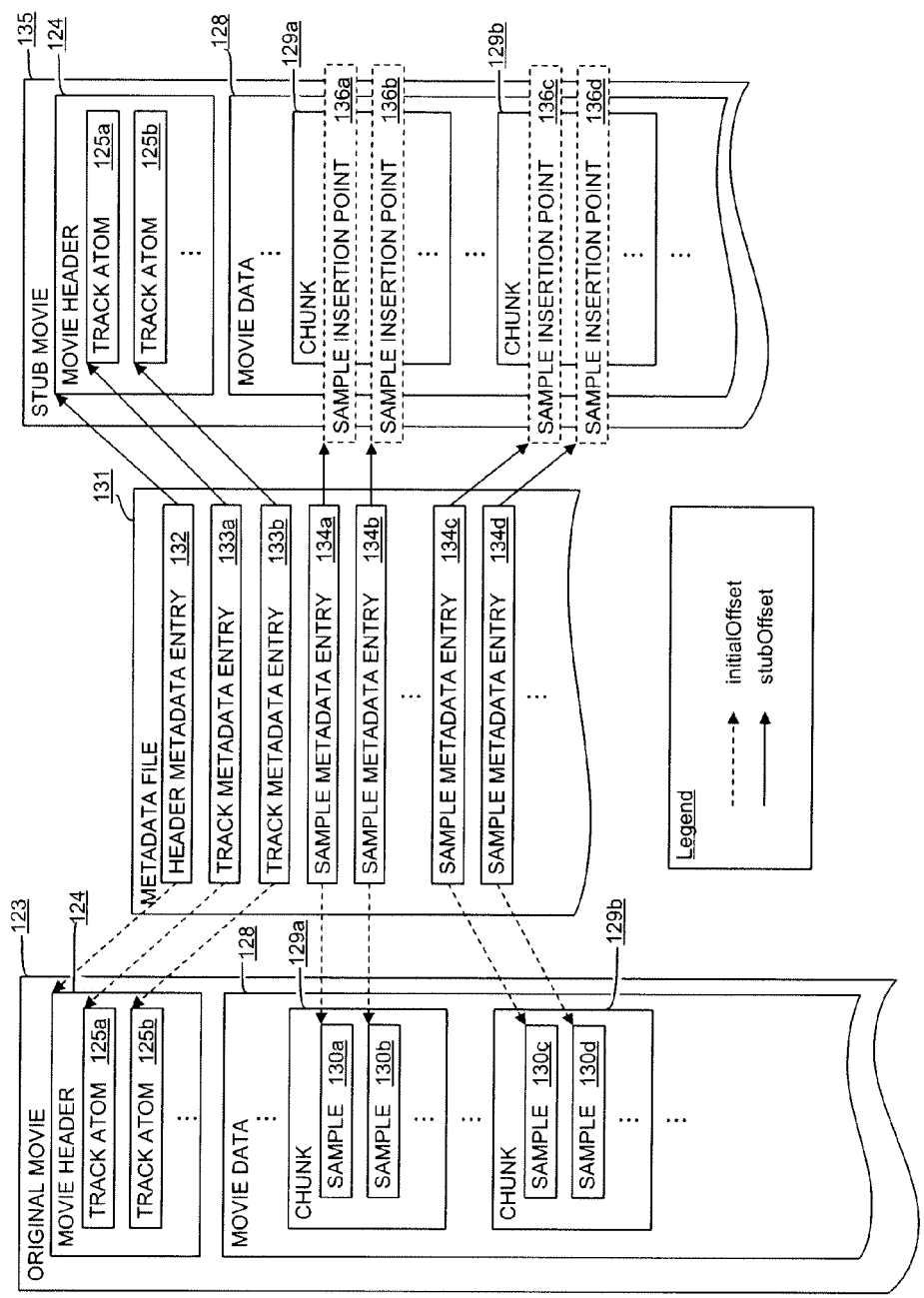
FIG. 9 is a diagram showing the layout and contents of the intermediary data files generated in FIG. 3 and their relationship to one another, as well as to an unprotected movie, in accordance with one embodiment of the present invention.
Figure 10:
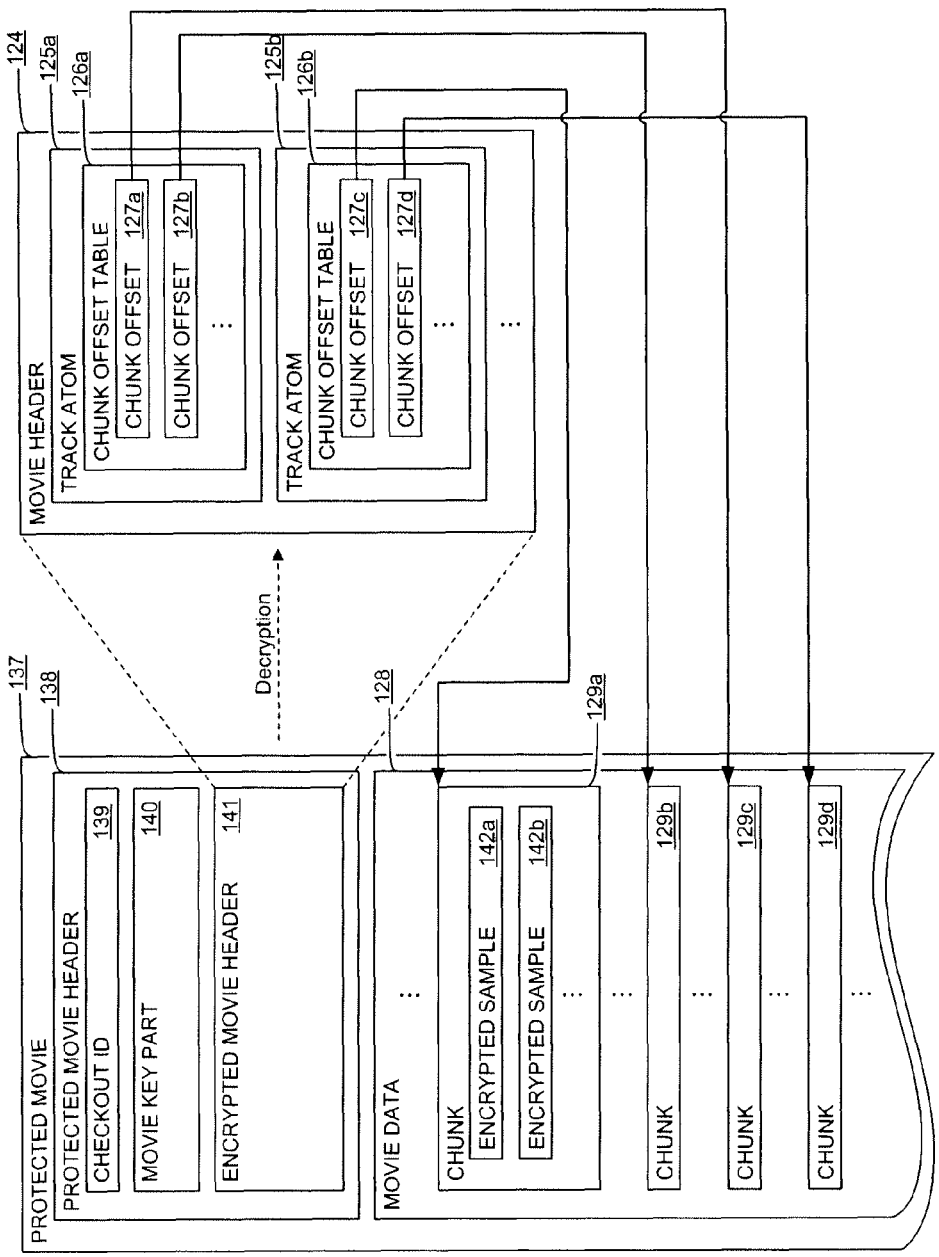
FIG. 10 is a diagram showing the layout and contents of a protected movie in accordance with one embodiment of the present invention.

FIG. 9 is a diagram showing the layout and contents of the intermediary data files generated in FIG. 3 and their relationship to one another, as well as to the unprotected movie, in accordance with one embodiment of the present invention. When a movie 123 is introduced into the DRM System, it is first processed by preprocessor 4. Preprocessor 4 generates two files that are later used by wrapper 5, along with the original movie 123, to quickly generate protected copies 137 of the movie. The first file output by preprocessor 4 is a metadata file 131 comprising metadata entries 132, 133a, 133b, 134a, 134b, 134c, 134d, etc. that describe particular portions of the movie 123. Entries are ordered according to the location in the original movie of the portion of the movie they describe. The second file output by preprocessor 4 is a stub movie 135 that is used as a template for generating protected copies 137 of the movie.

According to another embodiment of the present invention, preprocessor 4 generates and stores a single unified stub file (not shown in FIG. 9). In this embodiment, metadata 131 and movie header 124 are stored together in the unified stub file, without the actual movie data 128. Those skilled in the art will recognize that other ways of partitioning data in to various files is possible without departing from the inventive concepts disclosed herein.

Preprocessor 4 is configured to scan the header 124 of the original movie 123. The header 124 is a portion of a movie that contains, among other things, one or more track atoms 125a, 125b, etc. Each track atom 125 describes a track contained in the movie and indicates where the individual audio or video samples comprising the track are located within the movie. Whereas track atoms 125a, 125b, etc. are located within the movie header 124, every sample is located either before or after the header. Samples 130a, 130b, 130c, 130d, etc. are grouped into chunks 129a, 129b, etc.; the samples in a given chunk are contiguous, with no space between them. The location of a sample 130 is thus determined by the location of the chunk 129 it belongs to, and by the sizes of the samples that precede it in that chunk. These values are stored in the track atom 125 for the track to which the sample belongs.

When wrapper 5 generates a protected copy 137 of a movie, it encrypts each of the samples 130a, 130b, 130c, 130d, etc. in the original movie 123. To do this, wrapper 5 uses an encryption algorithm, or cipher, to process each sample, generating an encrypted sample 142a, 142b, etc. that is included in the protected movie 137 in place of the original, unencrypted sample. Any of several types of cipher may be used. Certain ciphers that may be used by the wrapper 5 to encrypt sample data generate encrypted samples that are larger than the original sample. As a result, a protected copy 137 of a movie may be larger than the original movie 123.

When a cipher is used that increases sample sizes, the locations of subsequent samples also change between the original movie 123 and the protected movie 137.

According to one embodiment of the present invention, preprocessor 4 is configured to: (i) identify the original movie header 124; (ii) identify the track atoms 125a, 125b, etc. in the header that describe the tracks in the movie; (iii) determine the location of each sample 130a, 130b, 130c, 130d, etc. for each track in the movie; (iv) determine, based on the cipher to be used by wrapper 5, the new size and location of each sample in protected copies 137 of the movie; and (v) write the metadata file 131 and the stub movie 135 to server data store 2 for later use by wrapper 5.

According to one embodiment of the present invention, preprocessor 4 makes use of a data structure, L, that stores an ordered list of metadata entries. The metadata entries stored in L are the same as those ultimately stored in the metadata file 131 when preprocessor 4 has finished processing a movie. According to this embodiment, there are three types of metadata entries, each describing a different portion of the movie:

The header metadata entry describes the movie header.

Track metadata entries describe track atoms contained in the movie header.

Sample metadata entries describe the samples that comprise the movie's tracks.

According to one embodiment of the present invention, each metadata entry stores the following values:

initialOffset—The location in the original movie 123 of the portion described.

stubOffset—The location in the stub movie 135 of the portion described, or, for sample metadata entries 134a, 134b, 134c, 134d, etc., the point 136a, 136b, 136c, 136d, etc. in the stub movie where an encrypted copy of the sample 130a, 130b, 130c, 130d, etc. described by the entry will be inserted to create protected copies 137 of the movie.

size—The size in the original movie 123 of the portion described.

sizeDelta—The difference between the size of the portion described in protected copies 137 of the movie and the size of the portion in the original movie 123.

According to one embodiment of the present invention, the initialOffset and stubOffset values are stored as "offsets" from the beginning of the original and stub movies, respectively—that is, as the amount of data between the beginning of the file and the portion of the movie described by the metadata entry.

FIG. 3 is a flow chart that illustrates a method by which an unprotected movie is processed to generate intermediary data for subsequent use in quickly generating protected copies of the movie in accordance with one embodiment of the present invention. In more detail, FIG. 3 illustrates the operation of the Preprocessor 4. At 34, preprocessor 4 first creates a header metadata entry 132 h describing the movie header 124 and adds it to L. The sizeDelta value of h is set to the amount by which the size of the movie header will increase between the original movie 123 and protected copies 137 of the movie. This is the sum of the sizeDelta values for all track metadata entries 133a, 133b, etc., plus the total size of any other data included in the header 138 of protected copies 137 of the movie, plus padding added prior to encryption by the wrapper 5.

Still referring to FIG. 3, at 35-36, preprocessor 4 adds a track metadata entry 133a, 133b, etc. to L describing the track atom 125a, 125b, etc. for each track in the movie. The sizeDelta value of a track metadata entry is set to the amount of data that wrapper 5 will insert into the corresponding track atom when creating protected copies of the movie. At 37-38, for each sample 130a, 130b, 130c, 130d, etc. in each track, preprocessor 4 adds a sample metadata entry 134a, 134b, 134c, 134d, etc. to L. The sizeDelta value of a sample metadata entry is set to the amount by which the cipher to be used by the wrapper 5 will increase the size of the corresponding sample.

According to one embodiment of the present invention, the stubOffset value of a metadata entry is not set at the time it is created.

At 39, L is sorted so that each metadata entry in the list (after the first) has a larger initialOffset value than the previous entry. At 40, a working copy of the original movie header 124 is created.

At 42-50, preprocessor 4 steps through the metadata entries in L, processing them in order, one at a time. While doing so, preprocessor 4 uses the offsetDelta variable to track how much the offset of the next portion of the movie will change between the original movie 123 and protected copies 137 of the movie. At 41, the offsetDelta variable is initially set to zero. At 44-45, after all track metadata entries have been processed and before any subsequent sample metadata entries are processed, offsetDelta is incremented to reflect any additional data that will be inserted into the header by the wrapper 5. At 46, as each metadata entry e apart from h is processed, and offsetDelta is incremented by e.sizeDelta. At 47-48, for each sample metadata entry 134a, 134b, 134c, 134d, etc., the working copy of the movie header is updated to reflect the new size of the corresponding encrypted sample 142a, 142b, etc. in protected copies 137 of the movie. This is done by incrementing the original value for the size of the sample by e.sizeDelta. If a sample metadata entry represents a sample that is the first sample in the chunk to which it belongs, the working copy of the header is also updated to reflect the new offset of that chunk. This is done by incrementing the original value for the chunk offset by offsetDelta.

At 52-65, preprocessor 4 steps through the metadata entries in L for a second time, processing them in order, one at a time. As it does so, preprocessor 4 writes the metadata file 131 and stub movie 135 to server data store 2, using the inputOffset variable to track how much of the original movie 123 has been processed. At 51, the inputOffset variable is initially set to zero. At 53-55, after all track metadata entries have been processed and before any subsequent sample metadata entries are processed, the remainder of the movie header 124 is copied from the original movie 123 to the stub movie 135, followed by h.sizeDelta bytes of padding, and inputOffset is set to h.initialOffset+h.size. At 56, for each metadata entry e in L, the preprocessor 4 first copies the portion of the original movie 123 between inputOffset and e.initialOffset to the stub movie. Portions of the header 124 are copied from the working header rather than the original movie file 123 itself so that the stub movie 135 reflects changes in sample sizes and chunk offsets (see supra paragraph 31). At 57-58, preprocessor 4 sets e.stubOffset to the current size of the stub movie 135—which value will be the same as the offset therein of the portion of the movie described by e—and writes a binary representation of e to the metadata file 131. At 59-60, if the metadata entry is a track metadata entry 133a, 133b, etc., the corresponding track atom 125a, 125b, etc. is copied from the working copy of the header 124 to the stub movie 135, followed by e.sizeDelta bytes of padding. This padding serves as a placeholder for data that will be inserted into the track atom by wrapper 5. (Samples are not copied into the stub movie because wrapper 5 reads them directly from the original movie.) At 61-62, after h is processed, inputOffset is set to h.initialOffset. At 63, for each entry except h, inputOffset is set to e.initialOffset+e.size after the entry is processed. At 66, after all metadata entries in L have been processed, the remainder of the original movie 123 is copied to the stub movie 135.

Other processing not reflected in this description is done as data is copied from the working copy of the header to the stub movie in order to maintain the integrity of the movie header as required by the file format specification, e.g. QuickTime.

Figure 4:
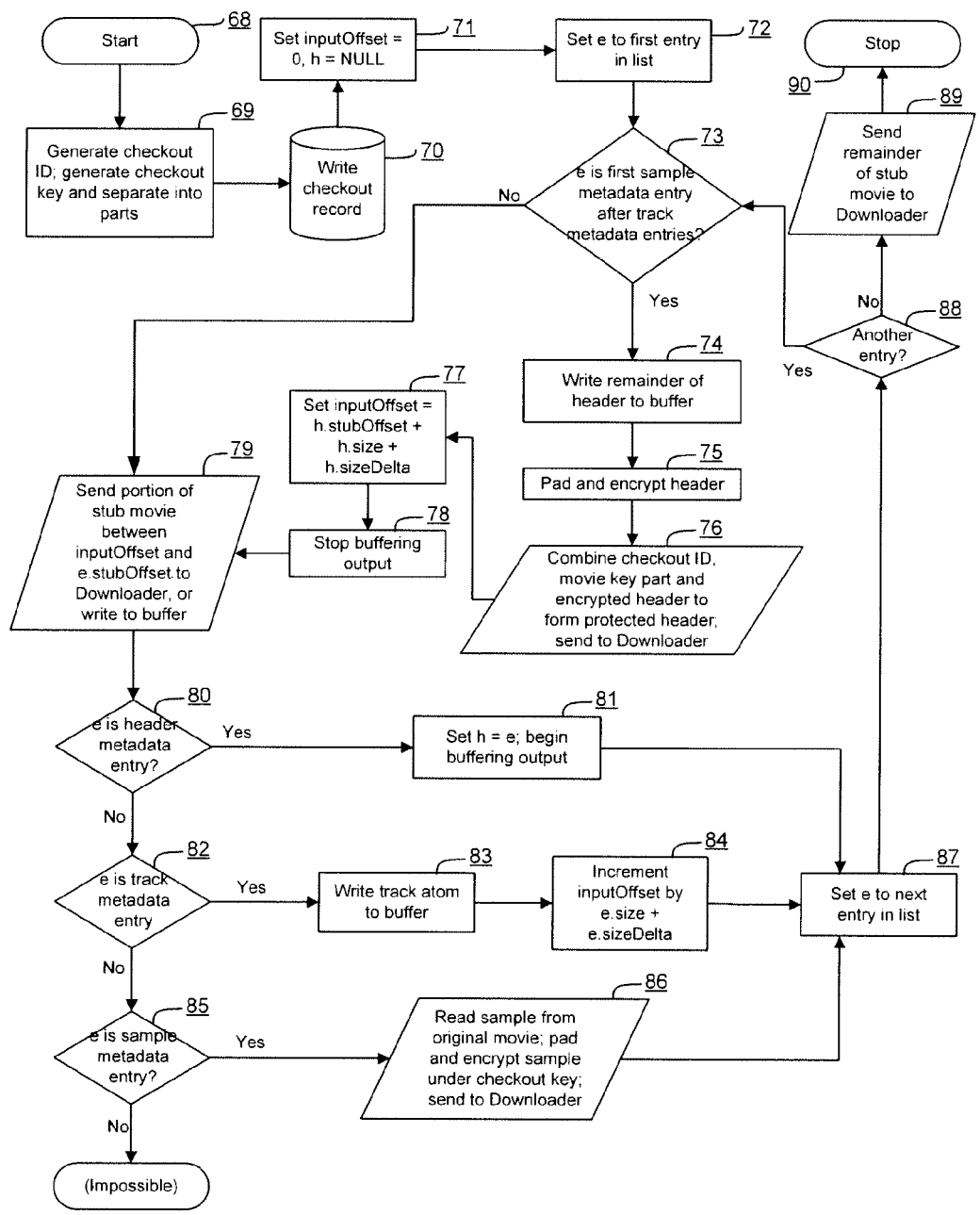
FIG. 4 is a flow chart that illustrates a method by which a protected movie is generated in accordance with one embodiment of the present invention.

FIG. 4 is a flow chart that illustrates a method by which a protected movie is generated in accordance with one embodiment of the present invention. When user 13 invokes downloader 9 to retrieve a movie from server 1, a protected copy 137 of the movie is generated by wrapper 5. Wrapper 5 uses the original unprotected movie 123, as well as the metadata file 131 and stub movie 135 generated by the preprocessor 4, to quickly generate a protected copy 137 of the movie. All three files are read from server data store 2 either before the protected movie is generated or segment-by-segment as they are needed.

According to one embodiment of the present invention, wrapper 5 is configured to encrypt the audio and video samples 130*a*, 130*b*, 130*c*, 130*d*, etc. contained in the original movie 123. It does so using a symmetric-key cipher. A symmetric-key cipher encrypts a sequence of binary data called the "plaintext" using a binary value called the "key" to generate an encrypted sequence of binary data called the "ciphertext." The ciphertext can later be decrypted using the same key to recover the plaintext. Many symmetric-key ciphers, known as block ciphers, require plaintexts to comprise an exact multiple of some number of bytes, called the "block size" for the cipher. To be encrypted under a block cipher, a plaintext that is not an exact multiple of the cipher's block size must have an appropriate amount of binary data, called "padding," appended to it before encryption.

At 69, before generating the protected copy 137 of the movie, wrapper 5 generates a checkout key, a cryptographic key that is used to encrypt the samples in the protected movie. At 69, the checkout key is separated into two values that can be recombined to recreate the checkout key: the movie key part and the server key part. Any method may be used for separating the key parts so long as it provides a one-to-one mapping between a given pair of key parts and the corresponding checkout key. At 69, a unique checkout identifier (checkout ID) is also generated. At 70 a checkout record is written to database 3 comprising the checkout ID and the server key part.

According to one embodiment of the present invention, wrapper 5 is configured to iterate through the metadata entries 132, 133*a*, 133*b*, 134*a*, 134*b*, 134*c*, 134*d*, etc. in the metadata file 131, processing them in order, one at a time. As it does so, wrapper 5 generates the protected movie 137 segment by segment. Segments are normally sent to downloader 9 via network 7 as soon as they are generated. When processing the movie header 124, however, wrapper 5 buffers its output, since it must encrypt the whole updated header before sending it to downloader 9. When buffering, wrapper 5 appends its output to a buffer in memory, rather than sending it directly to downloader 9.

As wrapper 5 processes the metadata entries, wrapper 5 reads through the stub movie 135 from beginning to end, tracking its current position with the inputOffset variable, which stores the current offset in the stub movie 135 in bytes. The variable h is used to store the header metadata entry 132. At 71 inputOffset is set to zero and h is set to NULL.

At 73-88, for each metadata entry e in the metadata file, wrapper 5 does the following:

At 73-78, if e is the first sample metadata entry after the track metadata entries—and thus the first metadata entry describing a portion of the movie that comes after the header—the protected movie header 138 is prepared and sent to downloader 9 before e is processed. (This will happen only after the header metadata entry 132 and all track metadata entries 133*a*, 133*b*, etc. have been processed.) At 74, to prepare the final movie header, wrapper 5 first appends the remainder of the header 124—the portion of the stub movie 135 between inputOffset and h.stubOffset+h.size+h.sizeDelta—to the buffer. At 75, the contents of the buffer, which now contains the complete updated movie header, are padded and encrypted under the checkout key to generate the encrypted header 141. At 76, the checkout ID 139, the movie key part 140 and the encrypted header 141 are combined to form the protected movie header 138. The protected movie header also contains an instruction to the player 11 to use an appropriate plug-in to access the encrypted header 141 therein. At 76, the protected header 138 is sent to the downloader 9. At 77-78, the inputOffset variable is updated to point to the portion of the stub movie immediately following the header—h.stubOffset+h.size+ h.sizeDelta—and buffering stops.

At 79, the portion of the stub asset between inputOffset and e.stubOffset is sent to downloader 9 or, if wrapper 5 is buffering its output, appended to the buffer.

At 80-81, if e is the header metadata entry 132, wrapper 5 stores it in h and begins buffering its output.

At 82-83, if e is a track metadata entry, the corresponding track atom is read into memory by reading the next e.size+e.sizeDelta bytes from the stub movie 135. The track atom is modified to reflect the fact that the track's samples will be encrypted, and to instruct the player to use an appropriate plug-in to access the track. The track atom is then written to the buffer. (Buffering is always on when track metadata entries are processed because the track atoms they represent are contained in the movie header.) At 84, the inputOffset variable is incremented by e.size+e.sizeDelta to point to the portion of the stub movie 135 immediately following the track atom.

At 85-86, if e is a sample metadata entry, the corresponding sample is read by reading e.size bytes from the original unprotected movie 123 starting at offset e.initialOffset. At 86, the sample is padded with the appropriate number of bytes of padding for the cipher to be used, encrypted under the checkout key, and sent to downloader 9. (Buffering is always off when sample metadata entries are processed because the samples they represent are not contained in the movie header.)

According to one embodiment of the present invention, after all metadata entries have been processed, the remainder of the stub movie 135—the portion from inputOffset to the end of the file—is sent to downloader 9. At this point, the entire protected movie 137 has been transmitted to client 8 and stored on client data store 10.

Figure 5:
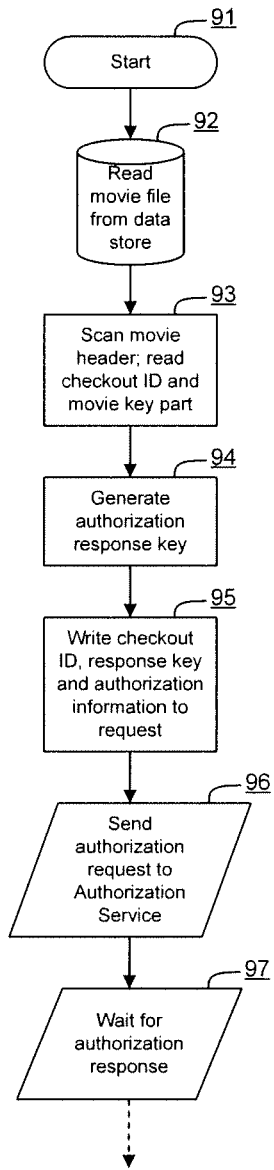
FIG. 5 is a flow chart that illustrates a method by which a client prepares and sends a request for authorization to play back a protected movie in accordance with one embodiment of the present invention.

FIG. 5 is a flow chart that illustrates a method by which client 8 prepares and sends a request for authorization to play back a protected movie in accordance with one embodiment of the present invention. At 92, when user 13 initiates playback of the protected movie 137, player 11 reads the movie from client data store 10. At 93, player 11 scans the protected movie header 138, reading the checkout ID 139 and the movie key part 140. At 94-96, player 11 generates an authorization response key, a random binary value, and sends an authorization request comprising the checkout ID, the authorization response key, and any other required authorization information to authorization service 6. At 97, player 11 waits for a response from authorization service 6.

According to one embodiment of the present invention, authorization service 6 determines whether client 8 is authorized to play the protected movie 137. Authorization service 6 may apply one or more rules to determine whether an authorization request should be granted. For example, under a particular set of rules, a request to play a protected movie might be denied if the movie is more than a threshold number of days, hours or minutes old may be denied under a particular set of rules. Particular embodiments of the invention may also require player 11 to supply additional information that authorization service 6 uses to determine whether playback should be authorized. For example, under a particular set of rules, authorization service 6 might require that the client include information about the application being used to play the movie, denying the request if an unauthorized application is being used. Finally, network information associated with the authorization request—such as the IP address of client 8 if the client 8 and server 1 are communicating via Internet Protocol—may be a factor in determining whether an authorization request is granted. After processing an authorization request, authorization service 6 returns either the server key part or an error code indicating the reason why playback is not authorized.

Figure 6:
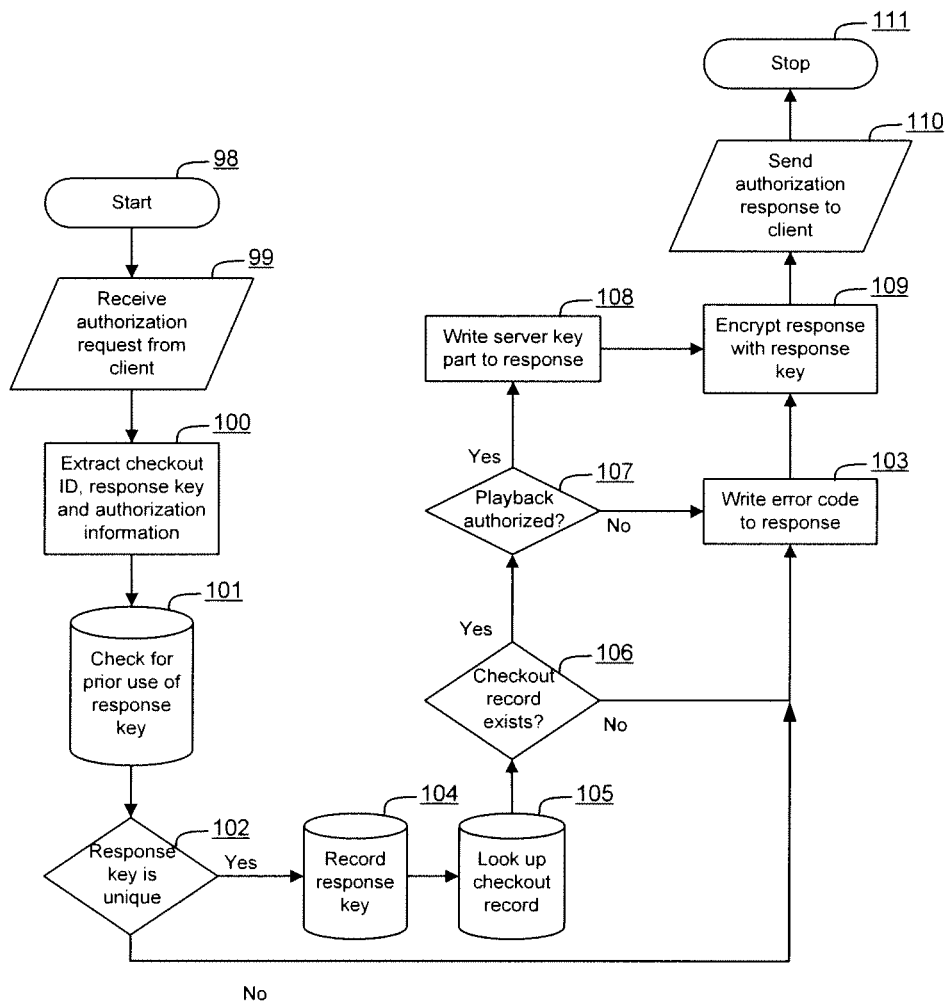
FIG. 6 is a flow chart that illustrate a method by which a server receives and processes a request for authorization then prepares and sends a response to the request in accordance with one embodiment of the present invention.

FIG. 6 is a flow chart that illustrate a method by which a Server receives and processes a request for authorization then prepares and sends a response to the request in accordance with one embodiment of the present invention. At 99-101, when authorization service 6 receives an authorization request, it first determines whether the authorization response key contained in the request is unique. At 102-103, if the supplied authorization response key has been used before by any authorization request, authorization service 6 responds with an error code. At 102, 104-105, if the authorization response key is unique, a record is stored in database 3 indicating that it may not be used in the future, and the checkout record matching the checkout ID contained in the authorization request is retrieved from the database. At 103, 106, if no checkout record exists with the specified checkout ID, an error code is returned. At 103, 106-108, if a matching checkout record is found, rules for determining whether playback is authorized are applied and an appropriate authorization response comprising either an error code or the server key part is prepared. At 109, the response is encrypted under the authorization response key sent by player 11. At 110 the response is sent to player 6.

Figure 7:
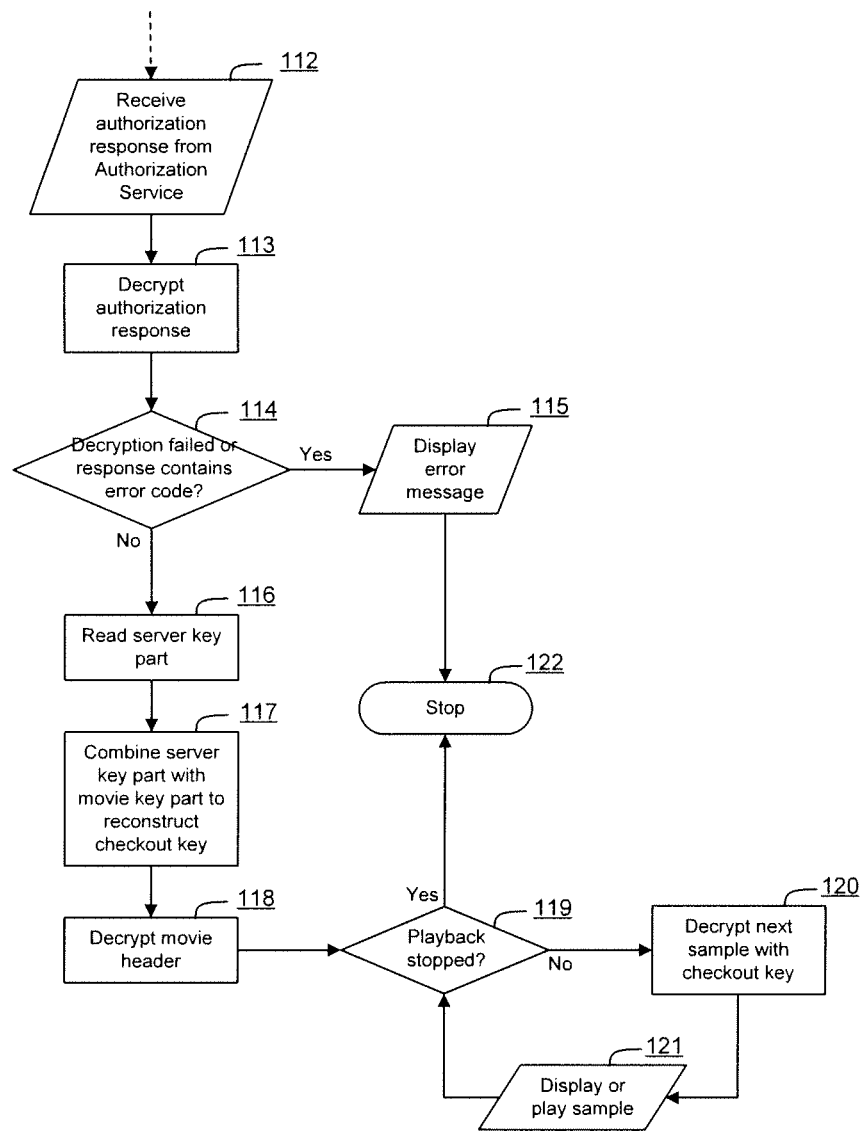
FIG. 7 is a flow chart that illustrates a method by which a client receives and processes a Server's response to its authorization request and plays back a protected movie in accordance with one embodiment of the present invention.
Figure 8:
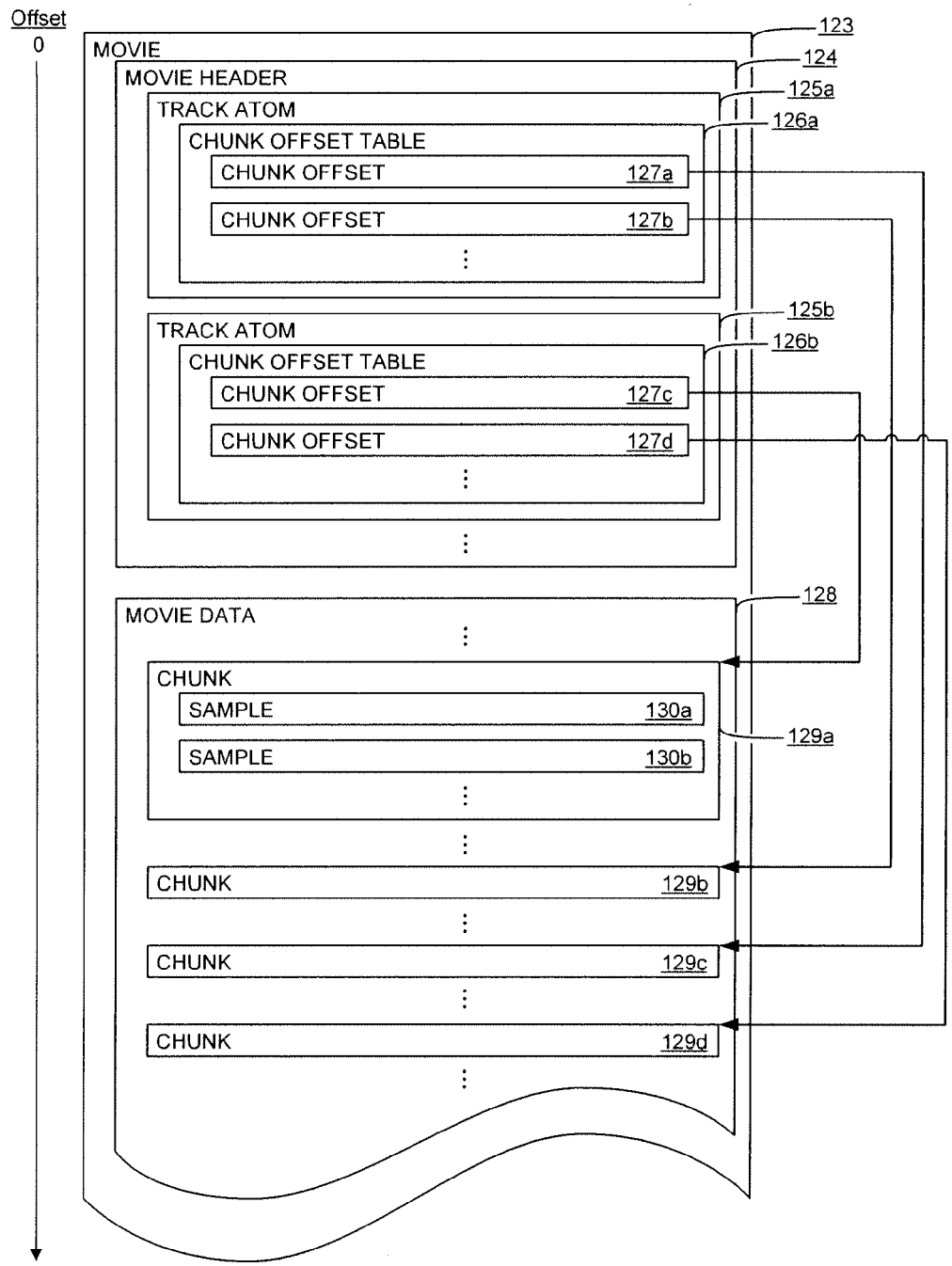
FIG. 8 is a diagram showing the layout and contents of an unprotected movie in accordance with one embodiment of the present invention.

FIG. 7 is a flow chart that illustrates a method by which a client receives and processes a Server's response to its authorization request and plays back a protected movie in accordance with one embodiment of the present invention. At 112-113, when player 11 receives the authorization response from the authorization service 6, it decrypts it using the authorization response key. Decryption will fail if the authorization response is not encrypted with the same authorization response key the Player included in the authorization request. At 114-115, if decryption failed or the decrypted response contains an error code, an appropriate error message is displayed indicating why authorization failed.

Because a unique authorization response key is included with every authorization request, a malicious user cannot gain access to a protected movie 137 by simply "replaying" a previous, successful authorization response when player 11 issues its authorization request. Because it is not encrypted under the same authorization response key included in subsequent authorization requests, decryption of an authorization response will fail if it is replayed in response to a subsequent request.

At 114 and 116-117, if the authorization response contains the server key part, player 11 combines the server key part with the movie key part to reconstruct the checkout key. At 118-121, player 11 decrypts the protected movie header and begins playback. At 119-121, playback continues until the movie ends or user 13 manually stops playback, at which time the movie key part, the server key part, and the restored checkout key are discarded.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A computer implemented method comprising:
by a server computer,
receiving a request from a client for digital media;
sending a protected copy of the digital media to the client;
receiving a request from the client to access the digital media;
sending cryptographic data to decrypt the protected digital media if the client is authorized to access the digital media; and
sending to the client cryptographic data that is different from cryptographic data sent to the client in response to previous requests for access to the protected data, to decrypt the protected digital media upon each subsequent request for access to the protected digital data.

2. The method of claim 1 wherein the digital media comprises one or more QuickTime movies, each of the one or more QuickTime movies comprising one or more of a video sample and an audio sample.

3. The method of claim 2 wherein the protected copy of the digital media comprises the samples encrypted using a checkout key, the checkout key comprising a movie portion and a server portion, wherein there is a one-to-one mapping between each combination of movie portion and server portion and each checkout key; the movie portion of the checkout key; and a numerical checkout ID.

4. The method of claim 2 wherein
the request comprises the checkout ID and an authorization response key, the authorization response key comprising a randomized binary value generated by the client; and
the method further comprises denying the request if it is determined that the response key was used by a previous request.

5. The method of claim 4, further comprising storing the response key if it is determined that the response key was not used by a previous request.

6. The method of claim 5, further comprising encrypting the response using the response key before sending the response to the client.

7. A computer implemented method comprising:
by a client computer,
sending, a request to a server for digital media;
receiving a protected copy of the digital media;
after receiving the protected copy, sending a request to access the digital media;
receiving cryptographic data to decrypt the protected digital media if the client computer is authorized to access the digital media;
if the client computer is authorized to access the digital media,
decrypting a sample of the protected digital media using the cryptographic data; and rendering the sample; and
receiving from the server cryptographic data that is different from cryptographic data received from the server in response to previous requests for access to the protected data, to decrypt the protected digital media upon each subsequent request for access to the protected digital data.

8. The method of claim 7 wherein the digital media comprises one or more QuickTime movies, each of the one or more QuickTime movies comprising one or more of a video sample and an audio sample.

9. The method of claim 8 wherein the protected copy of the digital media comprises the samples encrypted using a checkout key, the checkout key comprising a movie portion and a server portion, wherein there is a one-to-one mapping between each combination of movie portion and server portion and each checkout key; the movie portion of the checkout key; and a numerical checkout ID.

10. The method of claim 8 wherein the request comprises a checkout ID and an authorization response key, the authorization response key comprising a randomized binary value generated by the client.

11. The method of claim 10, further comprising displaying an error message if the decrypting fails or if the response comprises an error code.

12. The method of claim 7, further comprising continuing to decrypt and render samples until the user stops playback or the movie ends.

13. An apparatus comprising:
one or more processors configured to:
receive digital media;
receive a request from a client for digital media;
send the protected copy to the client;
receive a request from the client to access the digital media;
cryptographic data to decrypt the protected digital media if the client is authorized to access the digital media; and
send to the client cryptographic data that is different from cryptographic data sent to the client in response to previous requests for access to the protected data, to decrypt the protected digital media upon each subsequent request for access to the protected digital data.

14. The apparatus of claim 13 wherein the digital media comprises one or more QuickTime movies, each of the one or more QuickTime movies comprising one or more of a video sample and an audio sample.

15. The apparatus of claim 14 wherein the protected copy of the digital media comprises the samples encrypted using a checkout key, the checkout key comprising a movie portion and a server portion, wherein there is a one-to-one mapping between each combination of movie portion and server portion and each checkout key;
the movie portion of the checkout key; and a numerical checkout ID.

16. The apparatus of claim 14 wherein
the request comprises a checkout ID and an authorization response key, the authorization response key comprising a randomized binary value generated by the client; and
the one or more processors are further configured to deny the request if it is determined that the response key was used by a previous request or if the client is not authorized to play the media.

17. The apparatus of claim 16 wherein the one or more processors are further configured to store the response key if it is determined that the response key was not used by a previous request.

18. The apparatus of claim 17 wherein the one or more processors are further configured to encrypt the response using the response key before sending the response to the client.

19. An apparatus comprising:
one or more processors configured to:
send a request to a server for digital media;
receive a protected copy of the digital media;
after receiving the protected copy, send a request to access the digital media;
receive cryptographic data to decrypt the protected digital media if the apparatus is authorized to access the digital media;
if the apparatus is authorized to access the digital media, decrypt a sample of the protected digital media using the cryptographic data; and
render the sample; and
receive from the server cryptographic data that is different from cryptographic data received from the server in response to previous requests for access to the protected data, to decrypt the protected digital media upon each subsequent request for access to the protected digital data.

20. The apparatus of claim 19 wherein the digital media comprises one or more QuickTime movies, each of the one or more QuickTime movies comprising one or more of a video sample and an audio sample.

21. The apparatus of claim 20 wherein the protected copy of the digital media comprises the samples encrypted using a checkout key, the checkout key comprising a movie portion and a server portion, wherein there is a one-to-one mapping between each combination of movie portion and server portion and each checkout key; the movie portion of the checkout key; and a numerical checkout ID.

22. The apparatus of claim 20 wherein the request comprises a checkout ID and an authorization response key, the authorization response key comprising a randomized binary value generated by the client.

23. The apparatus of claim 22 wherein the one or more processors are further configured to display an error message if the decrypting fails or if the response comprises an error code.

24. The apparatus of claim 19 wherein the one or more processors are further configured to continue to decrypting and rendering samples until the user stops playback or the movie ends.

25. A nontransitory program storage device readable by a machine, embodying a program of instructions executable by the machine to perform a method, the method comprising:
by a server computer,
receiving a request from a client for digital media;
sending a protected copy of the digital media to the client;
receiving a request from the client to access the digital media;
sending cryptographic data to decrypt the protected digital media if the client is authorized to access the digital media;
sending a response to the client, the response indicating whether the client is authorized to access the digital media, the response further comprising cryptographic data to decrypt the protected digital media if the client is authorized to access the digital media; and
sending to the client cryptographic data that is different from cryptographic data sent to the client in response to previous requests for access to the protected data, to decrypt the protected digital media upon each subsequent request for access to the protected digital data.

26. A nontransitory program storage device readable by a machine, embodying a program of instructions executable by the machine to perform a method, the method comprising:
 by a client computer,
  sending a request to a server for digital media;
  receiving a protected copy of the digital media;
  after receiving the protected copy, sending a request to access the digital media;
  receiving a response, the response indicating whether the client computer is authorized to access the digital media, the response further comprising cryptographic data to decrypt the protected digital media if the client computer is authorized to access the digital media;
  if the client computer is authorized to access the digital media,
   decrypting a sample of the protected digital media using the cryptographic data; and
   rendering the sample; and
  receiving from the server cryptographic data that is different from cryptographic data received from the server in response to previous requests for access to the protected data, to decrypt the protected digital media upon each subsequent request for access to the protected digital data.

27. A computer implemented method comprising:
 receiving, at a server computer, a digital media file comprising:
  one or more digital video or audio samples; and
  a header identifying the samples by their offsets from the start of the file;
 computing the new offset for each sample that will result from encryption of preceding samples in the file;
 storing intermediary data comprising the new offsets in a data store;
 after storing the original digital media file and intermediary data, receiving a request from a client for the digital media;
 generating from the original digital media file and the intermediary data a protected copy of the digital media file in which samples from the original digital media file have been encrypted and the sample offsets replaced with those in the intermediary data; and
 sending the protected copy to the client.

28. A computer implemented method comprising:
 receiving, at a server computer, a digital media file comprising:
  one or more digital video or audio samples; and
  a header identifying the samples by their offsets from the start of the file;
 computing the new offset for each sample that will result from encryption of preceding samples in the file;
 storing intermediary data comprising the new offsets in a data store;
 after storing the original digital media file and intermediary data, receiving a request from a client for the digital media;
 generating from the original digital media file and the intermediary data a protected copy of the digital media file in which samples from the original digital media file have been encrypted and the sample offsets replaced with those in the intermediary data;
 storing a description of the protected copy in a database;
 sending the protected copy of the digital media file to the client;
 after sending the protected copy, receiving a request from the client to access the digital media;
 reading the description from the database based on information in the request; and
 sending a response to the client, the response indicating whether the client is authorized to access the digital media, the response further comprising cryptographic data to decrypt the protected digital media if the client is authorized to access the digital media; and
 sending to the client cryptographic data that is different from cryptographic data sent to the client in response to previous requests for access to the protected data, to decrypt the protected digital media upon each subsequent request for access to the protected digital data.

* * * * *